Sept. 11, 1962 M. VANZO ETAL 3,053,308
TIRE BUILDING APPARATUS AND METHOD
Filed April 8, 1958 3 Sheets-Sheet 1
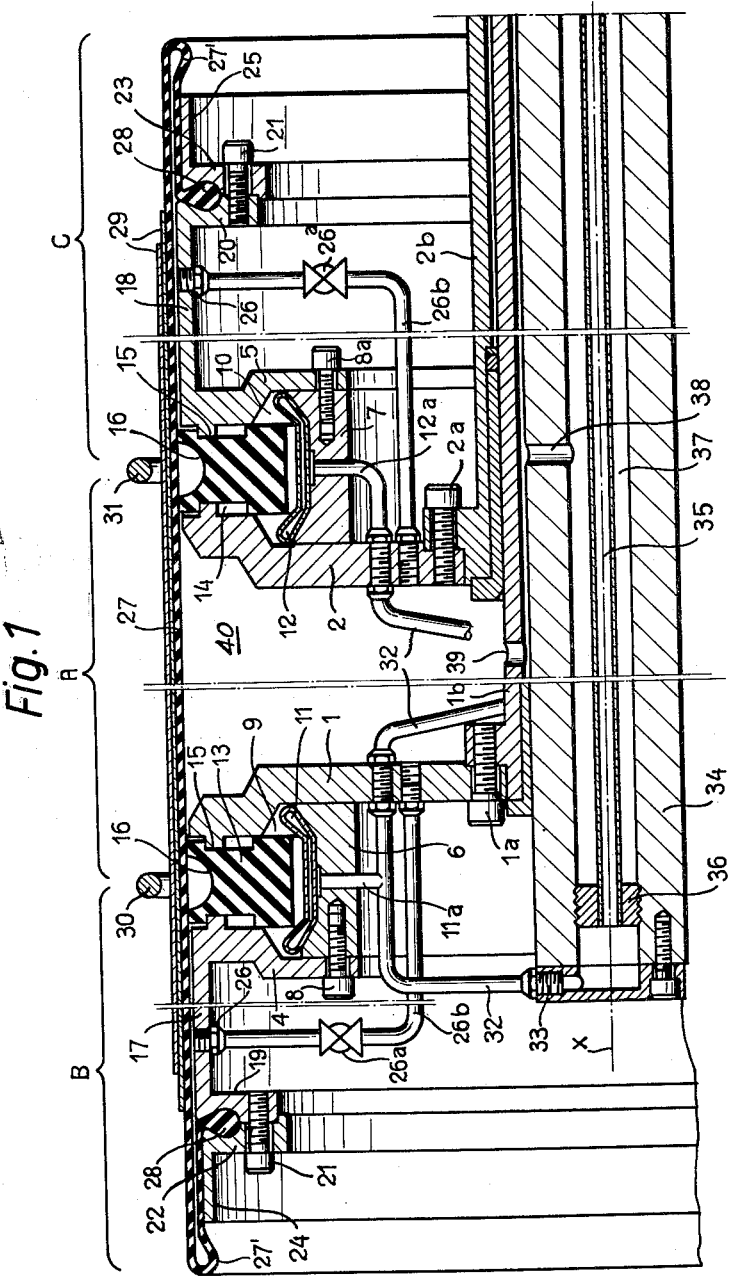

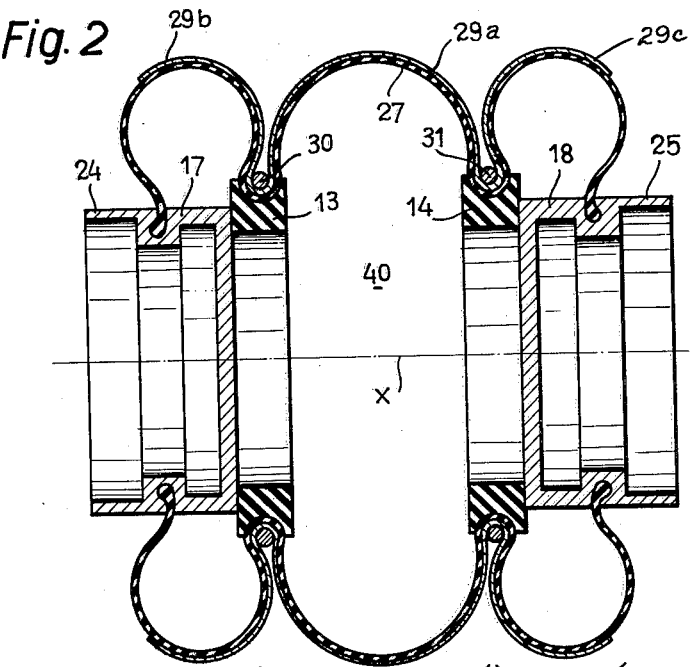
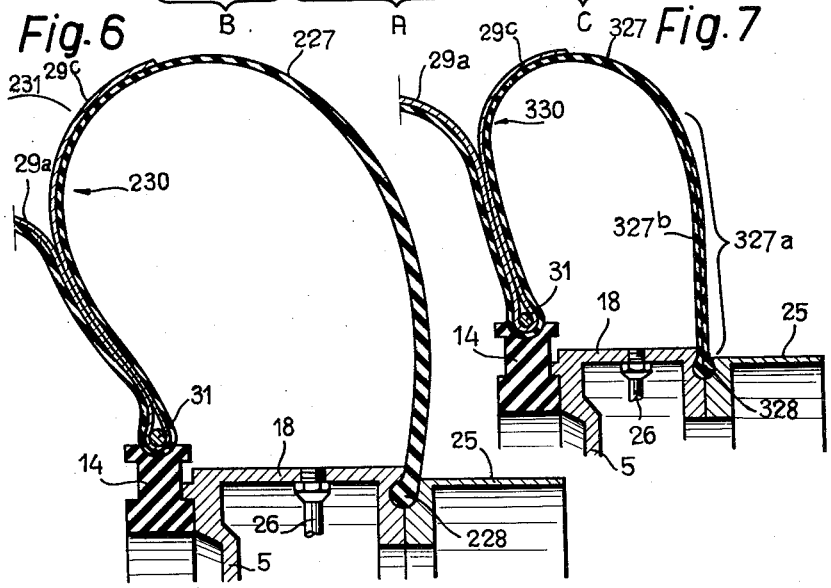

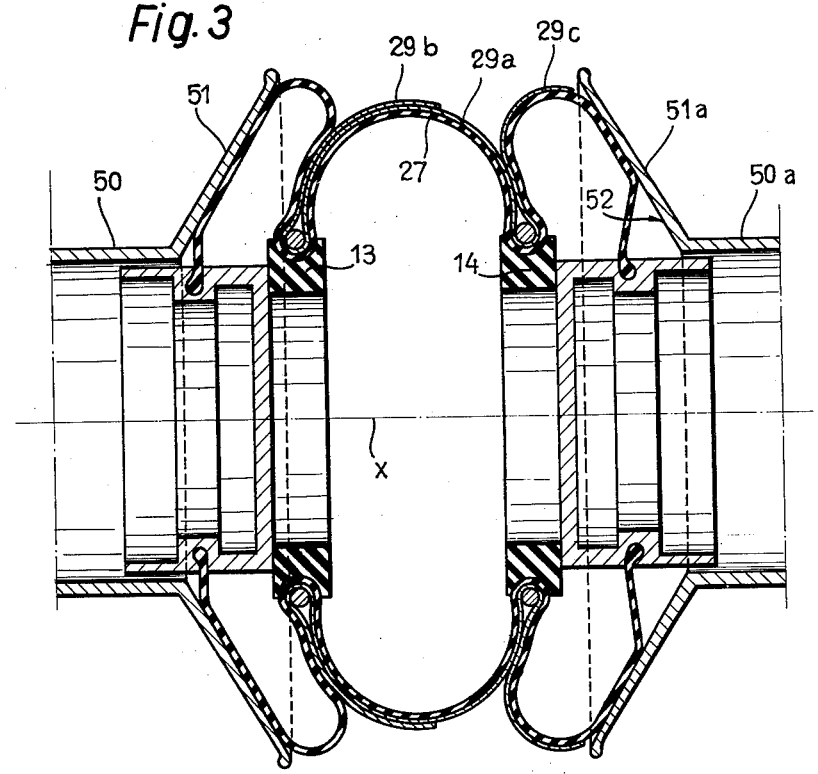
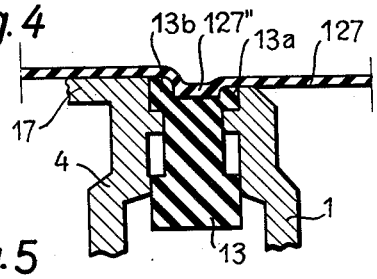
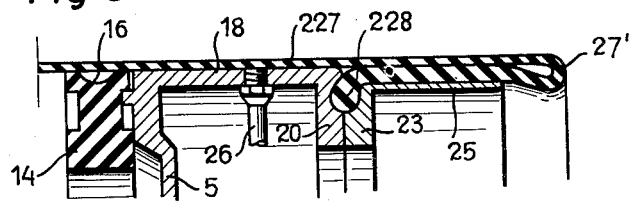

United States Patent Office 3,053,308
Patented Sept. 11, 1962

3,053,308
TIRE BUILDING APPARATUS AND METHOD
Marcello Vanzo, Dario Giletta, and Antonio Pacciarini, Milan, Italy, assignors to Pirelli Societe per Azioni, Milan, Italy
Filed Apr. 8, 1958, Ser. No. 727,074
Claims priority, application Italy Apr. 11, 1957
11 Claims. (Cl. 156—416)

This invention relates to a tire building apparatus of the type having a drum comprising a pair of rigid end discs mounted for relative axial movement, a circumferential seat in each disc having a variable effective diameter and a tubular diaphragm of resilient material extending between the discs in a co-axial relationship, adapted to be inflated and radially expanded to a generally toric form by fluid pressure.

The use of the apparatus of this type consists first of all in placing on the drum one or more cord fabric plies to form a sleeve having end regions projecting in an axial direction beyond the circumferential seats in the respective discs and arranging a bead for the tire cover to be manufactured in register with each seat. The seats are thereupon radially expanded, whereby the sleeve is enlarged at the beads and press-fitted against the latter. The tubular diaphragm is then inflated and both discs are drawn together, so that the body portion of the sleeve extending between the seats is radially expanded to a generally toric form similar to the form of the finished carcass. The subsequent step is carried out on the end regions of the fabric sleeve, that is the regions beyond the beads, and consists in radially spreading said regions and turning them up about their associated beads to fit them on the sleeve body. This operation is relatively easy to be carried out, when the axial length of said end regions is relatively small. However, it involves serious problems with tires in which said end regions should be longer so as to come into contact with each other and, possibly, partly overlap each other when they are turned up on the torically expanded body of the sleeve.

An object of this invention therefore consists in providing operational steps and means by which end regions of the sleeve can be spread and turned up on the sleeve body till they overlap each other.

A further object of this invention consists in providing said means of an inflatable and expansible nature so that the end regions can each be freely expanded substantially to the largest diameter of the toric shape of the sleeve body in combination with means adapted to exert an axial deforming thrust to said means of an inflatable nature, in order to axially push the end region towards the sleeve body till it is turned up on said body.

A still further object of this invention, in combination with the just mentioned object, consists in combining both said above-mentioned means to one inflatable component, the radial expansion of which automatically sets up at the same time said axial deforming thrust.

Considering the above-mentioned and further objects, which will be understood more clearly from the appended description, a tire building apparatus according to this invention comprises a drum which is characterized in that it includes a pair of co-axial rigid terminal discs capable of relative axial displacement, a circumferential seat of variable effective diameter in each disc adapted to radially expand and clamp one or more fabric plies laid on the drum against a bead placed in register with said seat, a rigid cylindrical extension extending from a circumferential portion on each disc in a co-axial relationship and direction opposite to the other disc, a tubular diaphragm of expansible material co-axially enclosing both discs with the seats therein and associated cylindrical extensions and forming beyond each of said extensions a portion inwardly bent to loop-form and anchored in a fluid-tight manner to a free end region on its associated extension, and means for delivering compressed air between the two discs as well as between each cylindrical extension and adjacent portion of the tubular diaphragm.

Embodiments of the improved apparatus are shown by way of example on the accompanying drawing, wherein:

FIGURE 1 is a part axial sectional view of the drum;
FIGURE 2 is a diagrammatical axial sectional view of the essential components of the drum at an intermediate step of a tire building process;
FIGURE 3 is a section similar to FIGURE 2 showing the drum and means co-operating therewith at a subsequent step of the building process;
FIGURE 4 shows a modification of the circumferentially expansible seat shown in FIGURE 1;
FIGURES 5 and 6 show under two different conditions a modified form of the tubular diaphragm shown in FIGURE 1 and
FIGURE 7 shows a further modification of said tubular diaphragm of FIGURE 1.

In FIGURE 1, two rigid metal circular discs 1, 2 are shown in co-axial and axially spaced relationship. The disc 1 is secured by means of bolts 1a to one end of a tubular shaft 1b. Similarly, the disc 2 is secured by means of bolts 2a to one end of the tubular shaft 2b which is mounted for telescoping displacement on the shaft 1b but is held against rotation with respect to the latter. Both shafts 1b, 2b together with the drum under consideration form part of a tire building machine, wherein the drum is capable of rotation about an axis X which is the common longitudinal axis of the discs 1, 2 and shafts 1b, 2b.

The outer face of the disc 1 has welded thereto a metal ring 6 of a tubular or sleeve-like shape, the outer face of said ring 6 having secured thereto by bolts 8 an annular metal disc 4. Similarly, the outer face on the disc 2 has welded thereto a metal ring 7, the axially outer face of said ring 7 having secured thereto by means of bolts 8a an annular metal disc 5. The structures comprising the components 1, 4, 6 and 2, 5, 7, respectively, shall be hereafter briefly referred to as rigid end discs of the drum.

The components of each end disc define a circumferential radial space 9, 10, respectively. Tubular inflatable bags 11, 12, respectively, are arranged at the bottom of said spaces and radially bear on the rings 6, 7, respectively. The inflatable bags are provided with tubular connections 11a, 12a, respectively, which radially extend through the respective rings 6, 7 and connect with a common compressed air supply conduit 32, whereby the bags 11, 12 can be simultaneously inflated. The conduit 32 connects at 33 with a tubular supporting shaft 34 which axially extends through the tubular shaft 1b. The shaft 34 has a conduit 35 arranged on its longitudinal axis X therein, one end of the conduit 35 being secured in a fluid-tight manner in a plug 36 in the shaft 34, its other end being adapted to be connected through a control valve with a source of compressed air. The diameter of the conduit 35 is smaller than the inner diameter of the tubular shaft 34, whereby a tubular space 37 is left around the conduit 35. Said space 37 is likewise adapted to be connected through a control valve with a source of compressed air. Radial passages 38, 39 in the shafts 34, 1b respectively, connect the space 37 with the space 40 between the two end discs.

The inflatable annular bags 11, 12 are encircled radially from the outside by expansible rubber rings 13, 14, respectively, each ring having a circumferential groove 16. On supply of compressed air through the conduits 35, 32 and connections 11a, 12a, the bags 11, 12 are inflated and radially expand the rubber rings 13, 14; while on connecting the conduit 35 with a vent, the bags 11, 12 collapse, the rubber rings 13, 14 being restored to their original diameter. The rings 13, 14 and their circumferential grooves 16 form the components which will be subsequently referred to as circumferential seats having a variable effective diameter. The largest and smallest diameters of said circumferential seats are defined by abutments such as 15, on the rings and end discs. More particularly, with the circumferential seats at their smallest diameter, as shown in FIGURE 1, the rings 13, 14 do not appreciably extend beyond the circumference of the end discs.

The maximum diameter of the circumferential seats is such that the bottom of each groove 16 is radially outside the circumference of the end discs. In other words, the maximum effective diameter is larger than the outer diameter of the end discs.

A tubular cylindrical extension 17 extends axially outwardly from the circumferential region of the ring 4 and is made rigid and of one piece with the ring 4. Similarly, a tubular cylindrical extension 18 extends axially outwardly from the circumferential region on the ring 5 and is made rigid and of one piece with the ring 5. The extensions 17, 18 end by flanges 19, 20 respectively, which are directed radially inwardly. Said flanges have secured thereto by bolts 21 similar flanges 22, 23, respectively, on two cylindrical metallic rigid rims 24, 25. The end discs together with their circumferential seats and associated cylindrical extensions 17, 18 are coaxially encircled by a tubular diaphragm 27 which extends from one end to the other of the drum and is made of a material impervious to air and resiliently expansible, such as rubber. The tubular diaphragm 27 is inwardly turned at the drum ends beyond the rims 24, 25, forming unsupported loops 27', 27'. The end regions of the diaphragm consequently radially bear on the outer circumferential surfaces of said rims and each end has an enlarged edge 28 which is clamped in a fluid-tight manner between the flanges 19, 22 and 20, 23, respectively. The axial length of the diaphragm 27 can therefore be assumed to be subdivided into three regions A, B, and C. The central region A extends between the seats of variable effective diameter, is unsupported and encircles the space 40 between the end discs. The end regions B and C extend from the respective seats of variable effective diameter towards and beyond their respective drum ends and are radially supported by their associated cylindrical extensions 17, 18 and rims 24, 25. The outer diameter of the rims 24, 25 is somewhat smaller than the outer diameter of the extensions 17, 18 so that under the conditions shown in FIGURE 1, the outer diameter of the tubular diaphragm 27 is substantially constant, notwithstanding doubling of the diaphragm at the rims 24, 25. A further essential feature resides in the fact that the loops 27' formed by the diaphragm 27 freely extend beyond the rims 24, 25 so that the outer diameter of the diaphragm keeps constant throughout the drum length.

The region A on the tubular diaphragm 27 can be radially expanded by supplying compressed air to the space 40 in the above described manner. In order to inflate and radially expand the regions B and C, both rigid extensions 17, 18 have radially extending therethrough tubular connections 26, 26 leading through control valves 26a, 26a and conduits 26b, 26b to the space 40. Therefore, when the valves 26a, 26a are open the diaphragm regions A, B, C can be simultaneously expanded or, by suitably controlling the valves 26a, 26a the region A can be expanded first and the regions B and C next.

In operation, on starting the building process of a tire, the drum is under the conditions shown in FIGURE 1. The end discs are in their most spaced relationship, such that the tubular diaphragm 27 is maintained at a substantially uniform diameter.

Fabric plies 29 are then laid on the drum in a tubular formation and axially extend throughout the central region A and over part length at least of each of the extreme regions B and C on the diaphragm 27. Beads 30, 31 for the tire to be manufactured are then slipped over the drum to an axial position in which each bead is coplanar and in register with its associated circumferential seat.

It will be seen from FIGURE 1 that the inner diameter of the beads is larger than the outer diameter of the drum inclusive of the fabric plies 29. Compressed air is now supplied to the conduit 35, whereby the annular bags 11, 12 are inflated and expand the rubber rings 13, 14 to their maximum effective diameter. The valves 26a, 26a are then opened, compressed air being fed to the tubular space 37, the end discs being simultaneously drawn together by a suitably synchronised movement by telescoping the tubular shafts 1b and 2b.

The conditions shown in FIGURE 2 have now been reached. The expansible rings 13, 14 therefore radially clamp the diaphragm 27 and fabric plies 29 to their associated beads 30, 31 in a fluid-tight manner for the rings 13, 14 and diaphragm 27 are made of rubber and tightly engage with each other. It will moreover be seen that all the regions A, B and C on the diaphragm have been expanded to toric shapes, all having a substantially identical maximum diameter, thereby correspondingly expanding the fabric plies 29. The tubular formation of said fabric plies can now therefore be considered to include a central portion 29a supported by the region A and two marginal portions 29b and 29c supported by the regions B, C, respectively, of the diaphragm. Already under the conditions shown in FIGURE 2 the beads 30, 31 are nearly fully wrapped by the fabric plies 29, the above-mentioned marginal portions of which should however still be turned up on the central portion.

In order to effect turning up, the drum ends each have associated therewith means diagrammatically shown in FIGURE 3. Said means comprises a rigid tubular member, comprising sleeve-like portions 50, 50a, respectively, including flanged portions flared to truncated cones 51, 51a, respectively. The concave surface, such as 52, of each flange faces towards the center of the drum, whereby the two concave surfaces face each other. The sleeve-like portions 50, 50a are held centered on the axis X and axially guided and driven by means not shown, the detailed structure of which is not covered by the objects of this invention. The concave conical surface of each of said members is therefore capable of axially pressing and squeezing inwardly the torus formed by the respective regions B and C of the diaphragm substantially as shown in FIGURE 3. It will be seen from this figure, that the left-hand member 50, 51 has already pushed the region B on the diaphragm 27 to such an extent such that the marginal portion 29b of the fabric has been fully turned up on the central toric portion, while the right-hand member 50a, 51a is still at an intermediate step of its axial movement to the left on the figure so that the portion 29c of the fabric has not yet been turned up. At any rate, on further movement to the left of the last mentioned member, the portion 29c is likewise ultimately brought against the middle toric portion of the fabric similarly to the portion 29b.

On completion of this process, the two members 50, 51 and 50a, 51a are drawn apart and the tread flanks applied and rolled over the carcass; successively, the three toric chambers formed by the respective regions of the diaphragm 27 released from pressure or, better said, connected with a vacuum source, whereupon the inflatable annular bags 11, 12 are deflated, whereby the expansible rings 13, 14 are restored to their minimum diameter. Considering the relations mentioned above between the effective diameters of the circumferential seats and outer diameter of the end discs and their respective cylindrical extensions, it will be easily understood that the finished tire can now be easily slipped off the drum inasmuch as the inner diameter of the tire beads is obviously larger than the outer diameter of the drum in its inoperative condition (FIGURE 1).

It will be understood from the above that the tubular diaphragm 27 is anchored to the rigid drum portions at its ends only, which are formed with enlarged edges 28. This construction therefore allows a certain axial freedom of movement of the diaphragm. Consequently, on starting each building process care should be taken that the portions B and C of the diaphragm are similar and the loops 27′ are evenly positioned beyond the rims 24, 25. Moreover, on slipping on the drum a pocket of fabric plies accidental displacements in an axial direction should be avoided between the diaphragm 27 and expansible rings 13, 14.

Considering the above and further reasons it may be advantageous to modify the drum structure as indicated in FIGURE 4. In this figure components similar to those shown in FIGURE 1 have been provided with the same reference numerals, the tubular diaphragm being, however, denoted by 127. It will be seen that the circumferential groove (16 in FIGURE 1) in the expansible ring 13 is of a substantially rectangular cross-sectional shape, the diaphragm 127 being formed on its inner surface with a circumferential annulus 127″ engaged in said groove.

The other expansible ring 14 and adjacent zone of the diaphragm are of course modified in a similar manner.

In the construction shown in FIGURE 4, the circumferential groove is defined by a relatively low flank 13a and a relatively high flank 13b, the latter being arranged adjacent the extension 17 and the respective end portion of the diaphragm 127. Consequently, on expansion of the ring 13, in a manner similar as shown in FIGURE 2, the relatively low flank 13a affords a smooth merging of the body of the fabric sleeve 29 and the sleeve region clamped to the bead 30. On the other hand, on inflating the central portion of the diaphragm, the higher flank 13b efficiently checks the bead 30 which might otherwise be pushed out of its seat by the air pressure in the space 40.

In FIGURES 5, 6 and 7 components similar to those shown in FIGURE 1 are denoted by the same reference numerals.

In FIGURES 5 and 6 the tubular diaphragm 227 is equivalent to the diaphragm 27 in FIGURE 1, but for a detail. It will be seen that at its inwardly turned region the diaphragm 227 is made of a variable thickness. More particularly, its thickness gradually increases towards the enlarged edge 228. It will be easily understood that the thicker regions are more difficult to expand than the thinner regions. Consequently, when the structure is under conditions similar to those shown in FIGURE 2, an axial deforming component arises as denoted by 230 in FIGURE 6. In other words, the portion of the diaphragm 227 between the bead 31 and edge 228 is asymmetrically deformed and forms a balloon in a direction 230. Inflating of this portion of the diaphragm entails a thrust in the direction 230 whereby the end portion 29c of the sleeve 29 is enlarged and gradually pushed against the sleeve body 29 till it is fully turned up on said body as indicated by the arrow 231.

Comparison of FIGURE 1 with FIGURES 5 and 6 shows that the latter refer to the right-hand end on FIGURE 1. However, it is understood that the left-hand end also of the diaphragm 27 in FIGURE 1 can be modified in the same manner as shown in FIGURES 5 and 6. In operation, the two end portions of the diaphragm as modified can be sequentially affected, so as to at first enlarge and turn up for instance the portion 29b of the sleeve 29, thereafter the portion 29c of said sleeve or vice versa. To this end it will be sufficient to suitably control the valves denoted by 26a in FIGURE 1.

The embodiment shown in FIGURE 7 is intended substantially for the same operation as the embodiment in FIGURES 5 and 6. However, an end region 327a on the tubular diaphragm 327 is provided with an inner armature 327b for instance of cotton, nylon threads or metal wires, which are radially directed under the conditions shown in FIGURE 7. However, considering the diaphragm 327 under conditions similar to those shown in FIGURE 5, the armature threads or wires 327b will be situated on the generatrices of the diaphragm. It will therefore be understood that the region 327a is less expansible than the remaining portions of the tubular diaphragm 327 which under the conditions shown entails an axial deformation thrust 330 similar to the thrust 230 according to FIGURE 6. In this case also, the opposite end of the diaphragm 327 is similar in structure to the structure shown and operation of said structure involves processes similar to those described with reference to FIGURES 5 and 6.

It will be obvious to the experts in the art that this invention is not limited to the examples shown in the drawings and numerous modifications can be made within the limits of technical equivalence and within the scope of the appended claims.

What we claim is:

1. In an apparatus for building tires, a drum comprising a pair of co-axial rigid end discs capable of relative axial displacement, a circumferential seat of a variable effective diameter in each disc adapted to radially expand and clamp at least one ply of fabric laid on the drum against a bead for the tire to be manufactured arranged in register with said seat, a rigid cylindrical extension extending from a circumferential portion on each disc in a coaxial relationship and direction opposite to the other disc, a tubular diaphragm of expansible material coaxially enclosing both discs together with the seats therein and their associated cylindrical extensions and forming beyond each of said extensions a portion inwardly turned to loop shape anchored in a fluid-tight manner to a free end region on its associated extension, and means for supplying compressed air between the two discs as well as between each cylindrical extension and adjacent portion of the tubular diaphragm.

2. In a tire building apparatus having a drum comprising a pair of coaxial rigid terminal discs capable of relative axial displacement, a circumferential seat in each disc adapted to receive a bead for a tire cover to be manufactured, and a tubular diaphragm of expansible material extending between the discs for supporting at least one ply of fabric, the combination of a rigid cylindrical extension extending from a circumferential region on each disc in a coaxial relationship and in a direction opposite to the other disc, a tubular diaphragm section of pneumatically inflatable material encircling each of the two cylindrical extensions and forming a loop beyond its associated cylindrical extension, and means for inflating the two tubular sections.

3. In a tire building apparatus comprising a building drum, the combination of two coaxial rigid end discs capable of relative axial displacement, a rigid cylindrical extension extending from a circumferential region on each disc coaxially and in a direction opposite to the other disc, a tubular diaphragm of expansible material circumferentially encircling both extensions and bridging said discs, said diaphragm comprising end regions inwardly turned to loop form with free edges anchored in a fluid-tight manner to their associated extension, means for separating in a fluid-tight manner the bridge portion of the diaphragm with respect to the portions comprising the regions turned inwardly to loop shape, and means for supplying compressed air to the space confined by the discs and the bridge portion of the diaphragm as well as to the spaces confined by the extensions and diaphragm portions encircling said extensions.

4. In the combination as claimed in claim 3, a pair of annular members capable of coaxial movements to the drum towards and from each other, each of said members having a frusto-conical annular front face facing the other member adapted to engage in an axial direction one of said last mentioned diaphragm portions when in inflated condition.

5. In an apparatus as claimed in claim 3, said fluid-tight separating means comprising a circumferential seat capable of radial expansion in each disc and a resilient annular re-enforcement carried by the diaphragm engaging with its inner circumference the said seat.

6. In an apparatus for building tires including a drum comprising two coaxial end discs mounted for relative axial displacement, a tubular diaphragm of resilient material having a portion bridging the discs, means for inflating said portion of the diaphragm, an expansible circumferential ring on each disc forming a seat adapted to receive a bead for the tire to be manufactured and means for expanding said rings, the said tubular diaphragm slipped over the said expansible rings and axially extending beyond said rings forming beyond each ring a portion bent inwardly towards its respective disc, a rigid tubular extension extending from each disc for radially supporting from the inside a portion of the diaphragm axially extending beyond its expansible ring, means for fluid-tight anchoring the edges of the tubular diaphragm to the respective cylindrical extensions, whereby the end portions of the diaphragm between said edges and the respective expansible rings can be inflated each by pressure fluid to a toric shape, and means for deforming each of said end portions of the diaphragm in their inflated condition to set up a deforming component directed towards the bridge portion of the diaphragm.

7. In an apparatus as claimed in claim 6, said means for deforming each of said end portions of the diaphragm comprising a rigid ring member associated with each end of the drum, said rigid ring member being mounted for axial displacement towards a position in which it coaxially encircles its associated end of the drum and is adapted to exert a generally axial thrust on its respective end portion of the tubular diaphragm in the inflated condition thereof in order to set up said deforming component.

8. In an apparatus as claimed in claim 7, the rigid ring member having a surface of a generally frusto-conical hollow shape for engagement with its respective end portion of the diaphragm in the inflated condition thereof.

9. In an apparatus as claimed in claim 6, said means for deforming each of said end portions of the tubular diaphragm comprising in each of said portions of the diaphragm a wall portion relatively more extensible and a wall portion relatively less extensible, said first mentioned portion being situated between its respective expansible ring and said second mentioned portion, whereby the end portion when inflated tends to form a balloon towards the diaphragm portion bridging the discs.

10. In an apparatus as claimed in claim 9, the wall portion relatively less extensible having a larger thickness than the wall portion relatively more extensible.

11. In an apparatus as claimed in claim 9, the relatively less extensible wall portion comprising an inner reinforcement.

References Cited in the file of this patent

UNITED STATES PATENTS

| | | |
|---|---|---|
| 1,525,455 | Logan | Feb. 10, 1925 |
| 1,551,040 | Marquette | Aug. 25, 1925 |
| 2,007,909 | State | July 9, 1935 |
| 2,084,009 | Sohl | June 15, 1937 |
| 2,182,176 | Maranville | Dec. 5, 1939 |
| 2,614,951 | Iredell | Oct. 21, 1952 |
| 2,715,931 | Frazier | Aug. 23, 1955 |
| 2,717,628 | Wikle | Sept. 13, 1955 |
| 2,754,886 | Bishop | July 17, 1956 |
| 2,814,330 | Vanzo et al. | Nov. 26, 1957 |
| 2,814,331 | Vanzo et al. | Nov. 26, 1957 |

FOREIGN PATENTS

| | | |
|---|---|---|
| 175,754 | Great Britain | Feb. 20, 1922 |
| 62,560 | Sweden | Mar. 8, 1927 |
| 463,422 | Canada | Feb. 28, 1950 |
| 856,513 | Germany | Nov. 20, 1952 |